United States Patent
Craddock et al.

(10) Patent No.: US 7,330,488 B2
(45) Date of Patent: Feb. 12, 2008

(54) SYSTEM, METHOD, AND ARTICLE OF MANUFACTURE FOR SYNCHRONIZING TIME OF DAY CLOCKS ON FIRST AND SECOND COMPUTERS

(75) Inventors: David F. Craddock, New Paltz, NY (US); Richard K. Errickson, Poughkeepsie, NY (US); Thomas A. Gregg, Highland, NY (US); Bruce Marshall Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 11/016,465

(22) Filed: Dec. 17, 2004

(65) Prior Publication Data

US 2006/0133426 A1    Jun. 22, 2006

(51) Int. Cl.
*H04J 3/06* (2006.01)

(52) U.S. Cl. .................. 370/503; 375/354; 713/400; 327/141; 327/144

(58) Field of Classification Search ........... 370/503; 375/354, 357; 713/400; 714/55; 327/144, 327/141; 340/825.2
See application file for complete search history.

(56) References Cited

U.S. PATENT DOCUMENTS

| | | | | |
|---|---|---|---|---|
| 5,146,585 A * | 9/1992 | Smith, III | .................. | 713/400 |
| 5,450,590 A * | 9/1995 | Elko et al. | .................. | 715/741 |
| 5,504,878 A * | 4/1996 | Coscarella et al. | ......... | 709/248 |
| 5,636,373 A | 6/1997 | Glendening et al. | ........ | 395/551 |
| 6,138,243 A | 10/2000 | Mealey et al. | .............. | 713/400 |
| 6,625,675 B2 | 9/2003 | Mann | .......................... | 710/61 |
| 6,643,791 B1 | 11/2003 | Teodorescu | ................. | 713/500 |
| 6,654,824 B1 | 11/2003 | Vila et al. | ..................... | 710/60 |
| 2001/0050633 A1* | 12/2001 | Thomas | ..................... | 342/387 |
| 2002/0018402 A1* | 2/2002 | Egle et al. | .................... | 368/46 |
| 2002/0034973 A1* | 3/2002 | Avis | .......................... | 455/574 |
| 2002/0144175 A1 | 10/2002 | Long et al. | ................... | 714/11 |
| 2003/0065963 A1 | 4/2003 | Gregg | ........................ | 713/500 |
| 2007/0025036 A1* | 2/2007 | Morris et al. | ................ | 361/64 |

* cited by examiner

*Primary Examiner*—Ajit Patel
(74) *Attorney, Agent, or Firm*—Cantor Colburn LLP; William A. Kinnaman, Jr.

(57) ABSTRACT

A system, method, and article of manufacture for synchronizing first and second time-of-day clocks on first and second computers, respectively, are provided. The first and second computers have first and second network interface cards with third and fourth clocks, respectively, thereon. The system utilizes time stamp values generated by the third and fourth clocks to synchronize the first and second time-of-day clocks.

12 Claims, 6 Drawing Sheets

SYSTEM, METHOD, AND ARTICLE OF MANUFACTURE FOR SYNCHRONIZING TIME OF DAY CLOCKS ON FIRST AND SECOND COMPUTERS

FIELD OF INVENTION

The invention relates to a system, method, and article of manufacture for synchronizing time-of-day clocks on first and second computers in a networked system.

BACKGROUND OF INVENTION

Computer servers in a networked system have been configured to maintain time-of-day synchronization. The computer servers utilize the time-of-day synchronization for determining a time sequence when tasks are completed by the computer servers. Tracking the order that tasks are completed is useful for restoring corrupted or lost files for example.

To obtain time-of-day synchronization, computer servers have exchanged time stamps determined by a time-of-day clock with one another. A drawback with this methodology, is that a software program on a first computer that accesses a time-of-day time stamp value from the time-of-day clock on the first computer, may not be able to immediately generate a message containing the time stamp value when the computer is operating near a maximum processing capacity with other tasks. Thus, when the message is transmitted from the first computer to a second computer, the time stamp value may not accurately indicate the actual time that the message was transmitted. Further, a transmission time period for the message to be transmitted from the first computer to the second computer may vary. When the second computer receives the message and attempts to synchronize its time-of-day clock with the time stamp value, a relatively large time difference may be present between the time-of-day clock in the first computer and the time-of-day clock in the second computer.

Accordingly, there is a need for a system and a method for providing an improved synchronization of time-of-day clocks between computers communicating with one another.

SUMMARY OF INVENTION

A method for synchronizing first and second time-of-day clocks on first and second computers, respectively, in accordance with an exemplary embodiment is provided. The first computer has a third clock on a first network interface card. The second computer has a fourth clock on a second network interface card. The first and second network interface cards communicate with one another via a communication network. The method includes generating a first message having a first time difference value and a second time stamp value and transmitting the first message from the first network interface card. The first time difference value corresponds to a time difference between the first time-of-day clock and the third clock. The second time stamp value corresponds to a time determined by the third clock on the first network interface card when the first message is transmitted from the first network interface card. The method further includes receiving the first message at the second interface card of the second computer. The method further includes generating a second message having the first time difference value, the second time stamp value, a third time stamp value, a fourth time difference value, and a fifth time stamp value and transmitting the second message from the second network interface card. The third time stamp value corresponds to a time determined by the fourth clock on the second network interface card when the first message is received by the second network interface card. The fourth time difference value corresponds to a time difference between the second time-of day clock and the fourth clock. The fifth time stamp value corresponds to a time determined by the fourth clock when the second message is transmitted from the second network interface card. The method further includes receiving the second message at the first network interface card and determining a sixth time stamp value associated with the second message. The sixth time stamp value corresponds to a time determined by the third clock when the second message is received by the first network interface card. The method further includes determining a seventh time difference value corresponding to a time difference between the first and second time-of-day clocks based on the first time difference value, the second time stamp value, the third time stamp value, the fourth time difference value, the fifth time stamp value, and the sixth time stamp value.

A networked system in accordance with another exemplary embodiment is provided. The networked system includes a first computer having a first network interface card and a first time-of-day clock and a second computer having a second network interface card and a second time-of-day clock. The first network interface card has a third clock and the second network interface card has a fourth clock. The first computer is configured to generate a first message having a first time difference value and a second time stamp value and to transmit the first message from the first network interface card. The first time difference value corresponds to a time difference between the first time-of-day clock and the third clock. The second time stamp value corresponds to a time determined by the third clock on the first network interface card when the first message is transmitted from the first network interface card. The second computer is configured to receive the first message at the second interface card. The second computer is further configured to generate a second message having the first time difference value, the second time stamp value, a third time stamp value, a fourth time difference value, and a fifth time stamp value and to transmit the second message from the second network interface card. The third time stamp value corresponds to a time determined by the fourth clock on the second network interface card when the first message is received by the second network interface card. The fourth time difference value corresponds to a time difference between the second time-of day clock and the fourth clock. The fifth time stamp value corresponds to a time determined by the fourth clock when the second message is transmitted from the second network interface card. The first computer is further configured to receive the second message at the first network interface card and to determine a sixth stamp value associated with the second message. The sixth time stamp value corresponds to a time determined by the third clock when the second message is received by the first network interface card. The first computer is further configured to determine a seventh time difference value corresponding to a time difference between the first and second time-of-day clocks based on the first time difference value, the second time stamp value, the third time stamp value, the fourth time difference value, the fifth time stamp value, and the sixth time stamp value.

An article of manufacture in accordance with another exemplary embodiment is provided. The article of manufacture includes a computer storage medium having a computer program encoded therein for synchronizing first and second time-of-day clocks on first and second computers, respectively. The first computer has a third clock on a first network interface card and the second computer has a fourth clock on a second network interface card. The first and second network interface cards communicate with one another via a communication network. The computer storage medium includes code for generating a first message having a first time difference value and a second time stamp value and transmitting the first message from the first network interface card. The first time difference value corresponds to a time difference between the first time-of-day clock and the third clock. The second time stamp value corresponds to a time determined by the third clock on the first network interface card when the first message is transmitted from the first network interface card. The article of manufacture further includes code for receiving the first message at the second interface card of the second computer. The article of manufacture further includes code for generating a second message having the first time difference value, the second time stamp value, a third time stamp value, a fourth time difference value, and a fifth time stamp value and transmitting the second message from the second network interface card. The third time stamp value corresponds to a time determined by the fourth clock on the second network interface card when the first message is received by the second network interface card. The fourth time difference value corresponds to a time difference between the second time-of-day clock and the fourth clock. The fifth time stamp value corresponds to a time determined by the fourth clock when the second message is transmitted from the second network interface card. The article of manufacture further includes code for receiving the second message at the first network interface card and determining a sixth time stamp value associated with the second message. The sixth time stamp value corresponds to a time determined by the third clock when the second message is received by the first network interface card. The article of manufacture further includes code for determining a seventh time difference value corresponding to a time difference between the first and second time-of-day clocks based on the first time difference value, the second time stamp value, the third time stamp value, the fourth time difference value, the fifth time stamp value, and the sixth time stamp value.

Other systems and methods according to the embodiments will be or become apparent to one with skill in the art upon review of the following drawings and detailed description. It is intended that at all such additional systems and methods be within the scope of the accompanying claims.

DESCRIPTION OF AN EMBODIMENT

Figure 1:
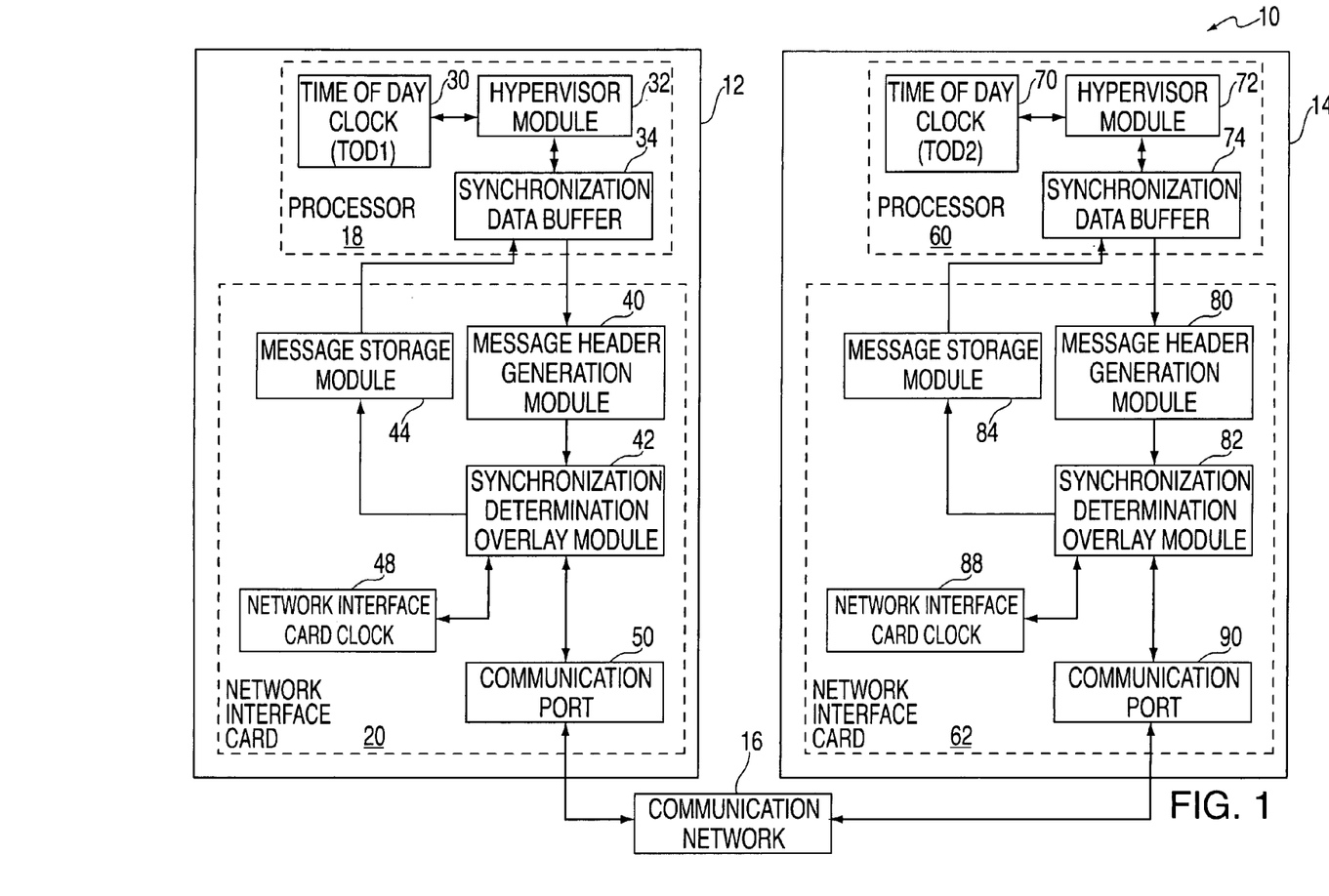
FIG. 1 is a networked system for synchronizing first and second time-of-day clocks on first and second computers.

Referring to the FIG. 1, a networked system 10 for synchronizing time-of-day clocks 30, 70 in computers 12, 14, respectively, is provided. The networked system 10 includes the computer 12, the computer 14, and a communication network 16.

The computer 12 operably communicates through the communication network 16 with the computer 14. The computer 12 includes a processor 18 and a network interface card 20 operably communicating with the processor 18.

The processor 18 includes the time-of-day clock 30, a hypervisor module 32, and a synchronization data buffer 34. The time-of-day clock 30 generates a time-of-day value (TOD1) indicative of the current time. When the processor 18 determines that a synchronization message is to be sent from the computer 12 to the computer 14, the processor 18 induces the hypervisor module 32 to obtain the time-of-day value (TOD1) from the clock 30. The hypervisor module 32 calculates a time difference ($\delta 1$) between the time-of-day clock 30 and the network interface card clock 48 utilizing the equation: $\delta 1 = TOD1 - HCATIME1$, where the (HCATIME1) value is generated by the clock 48. Thereafter, the hypervisor module 32 transfers the ($\delta 1$) value to the synchronization data buffer 34 which overlays the ($\delta 1$) value in a synchronization message 100 stored in the buffer 34. Thereafter, the buffer 34 transfers the synchronization message 100 to the message header generation module 40 of the network interface card 20.

The network interface card 20 is operably coupled to the processor 18 and is provided to transmit messages to the computer 14 and to receive messages from the computer 14. The network interface card 20 includes the message header generation module 40, a synchronization-determination-overlay module 42, a message storage module 44, a network interface card clock 48, and a communication port 50.

Referring to FIGS. 1-4, the message header generation module 40 is provided to include transmission protocol information in a synchronization message that is transmitted from the computer 12. In particular, when the message header generation module 40 receives the synchronization message 100 from the synchronization data buffer 34, the module 40 overlays fields 102, 104, and 106 in the synchronization message 100. The field 102 comprises a port1 address associated with the communication port 50 of the computer 12 and a port2 address associated with a communication port 90 of the computer 14. The field 104 comprises a receiving synchronization buffer number (B2) associated with a synchronization data buffer 74 of the computer 14 that is dedicated for receiving synchronization messages. The field 106 comprises a transmitting synchronization buffer number (B1) associated with the synchronization data buffer 34 of the computer 12 that is dedicated for receiving synchronization messages.

The synchronization-determination-overlay module 42 is provided to determine whether the message received from either the message header generation module 40 or the communication port 50 comprises a synchronization message for synchronizing the time-of-day clocks 30, 70. Further, the module 42 is further provided to overlay a time stamp value obtained from the network interface card clock 48 in synchronization messages either transmitted from the computer 12 or received by the computer 12.

Figures 2, 3:
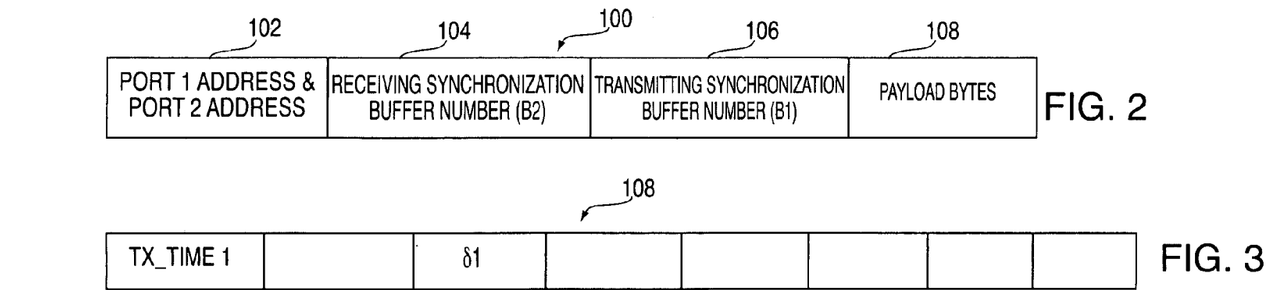
FIG. 2 depicts a first synchronization message that is transmitted from the first computer to the second computer of FIG. 1.
FIG. 3 depicts a payload portion of the first synchronization message of FIG. 2 prior to transmission thereof from the first computer.
Figure 4:
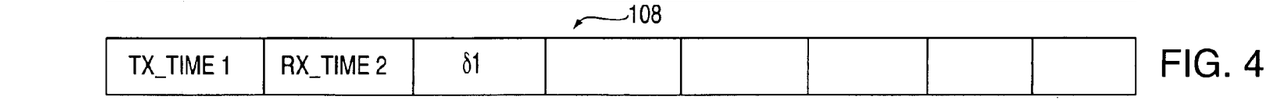
FIG. 4 depicts the payload portion of the first synchronization message of FIG. 2 after being received by the second computer.

When the synchronization-determination-overlay module 42 receives the first message 100 from the message header generation module 40, the module 42 compares the buffer number (B2) in the message 100 to a first predetermined value corresponding to the synchronization data buffer 74 of the computer 14 to determine whether the message 100 is a synchronization message. When the buffer number (B2) is equal to the first predetermined value, indicating that message 100 is a synchronization message, the module 42 accesses a time stamp value (TX_TIME1) generated by the network interface card clock 48. The time stamp value (TX_TIME1) corresponds to a transmission time of the message 100 from the computer 12. Thereafter, the module 42 overlays the time stamp value (TX_TIME1) in the synchronization message 100 and transfers the message 100 to the communication port 50. The communication port 50 transmits the synchronization message 100 through the communication network 16 to the communication port 90 of the computer 14.

Alternately, when the synchronization-determination-overlay module 42 receives a message 150 from the communication port 50, the module 42 compares the buffer number (B1) in the message 150 to a second predetermined value corresponding to the synchronization data buffer 34 of the computer 12 to determine whether the received message 150 is a synchronization message from the computer 14. When the buffer number (B1) is equal to the second predetermined value, indicating the message 150 is a synchronization message, the module 42 obtains a time stamp value (RX_TIME1) generated by the network interface card clock 48. The time stamp value (RX_TIME1) corresponds to a time when the message 150 is received by the computer 12. Thereafter, the module 42 overlays the time stamp value (RX_TIME1) in the message 150. Thereafter, the module 42 transfers the message 150 to the message storage module 44.

The message storage module 44 is provided to direct synchronization messages received by the computer 12 to the synchronization data buffer 34. For example, when the computer 12 receives the synchronization message 150, the synchronization-determination-overlay module 42 transfers the message 150 to the message storage module 44. Thereafter, the message storage module 44 transfers the message 150 to the synchronization data buffer 34.

Referring to FIG. 1, the computer 14 operably communicates through the communication network 16 with the computer 12. The computer 14 includes a processor 60 and a network interface card 62 operably communicating with the processor 60.

The processor 60 includes the time-of-day clock 70, a hypervisor module 72, and a synchronization data buffer 74. The time-of-day clock 70 generates a time-of-day value (TOD2) indicative of a current time. When the processor 70 determines that a synchronization message is to be transmitted after receiving a synchronization message 100 from the computer 12, the processor 70 induces the hypervisor module 72 to obtain the time of day value (TOD2) from the clock 70. The hypervisor module 72 calculates a time difference ($\delta 2$) between the time-of-day clock 70 and the network interface card clock 88 utilizing the equation: $\delta 2 = TOD2 - HCATIME2$, where the HCATIME2 value is generated by the clock 88. Thereafter, the hypervisor module 72 copies the payload area of the message 100 and stores the copied payload area in a message 150 stored in the buffer 74. Further, the hypervisor module 72 overlays the value ($\delta 2$) in the message 150. Thereafter, the buffer 74 transfers the message 150 to the message header generation module 80 of the network interface card 62.

Referring to FIGS. 1-4, the network interface card 62 is operably coupled the processor 60 and is provided to transmit messages from the computer 14 to the computer 12 and to receive messages from the computer 12. The network interface card 62 includes the message header generation module 80, a synchronization-determination-overlay module 82, a message storage module 84, a network interface card clock 88, and a communication port 90.

Figure 5:
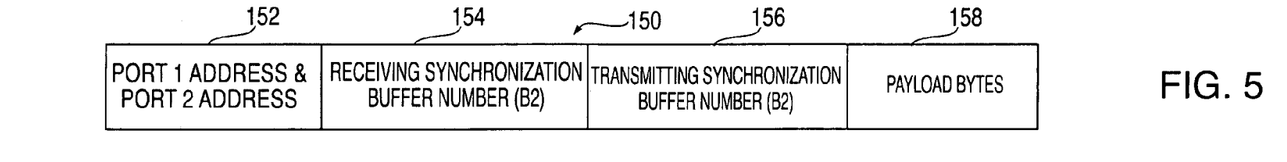
FIG. 5 depicts a second synchronization message that is transmitted from the second computer to the first computer.
Figure 6:
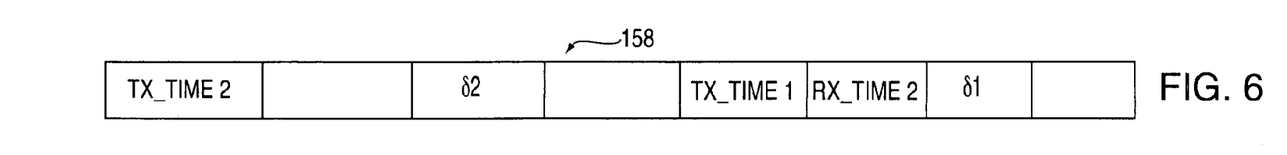
FIG. 6 depicts a payload portion of the second synchronization message of FIG. 5 prior to transmission thereof of the second computer.
Figure 7:
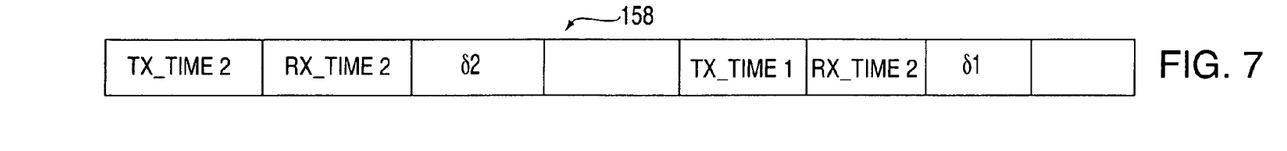
FIG. 7 depicts the payload portion of the second synchronization message of FIG. 5 after being received by the first computer.

The message header generation module 80 is provided to include transmission protocol information in a synchronization message that is transmitted from the computer 14. In particular, when the message header generation module 80 receives the synchronization message 150 from the synchronization data buffer 74, the module 80 overlays fields 152, 154, and 156 in the synchronization message 150. The field 152 comprises a port1 address associated with the communication port 50 of the computer 12 and a port2 address associated with a communication port 90 of the computer 14. The field 154 comprises a receiving synchronization buffer number (B1) associated with a synchronization data buffer 34 of the computer 12 that is dedicated for receiving synchronization messages. The field 156 comprises a transmitting synchronization buffer number (B2) associated with the synchronization data buffer 74 of the computer 14 that is dedicated for receiving synchronization messages.

The synchronization-determination-overlay module 82 is provided to determine whether the message received from either the message header generation module 80 or the communication port 90 comprises a synchronization message for synchronizing the time-of-day clocks 30, 70. Further, the module 82 is further provided to overlay a time stamp value obtained from the network interface card clock 88 in synchronization messages either transmitted from the computer 14 or received by the computer 14.

When the synchronization-determination-overlay module 82 receives the message 100 from the communication port 90, the module 82 compares the buffer number (B2) in the message 100 to a first predetermined value corresponding to the synchronization data buffer 74 to determine whether the message 100 is a synchronization message. When the buffer number (B2) is equal to the first predetermined value, indicating the message 100 is a synchronization message, the module 82 accesses a time stamp value (RX_TIME2) generated by the network interface card clock 88. The time stamp value (RX_TIME2) corresponds to a time when the message 100 is received by the computer 14. Thereafter, the module 82 overlays the time stamp value (RX_TIME2) in the synchronization message 100 and transfers the message 100 to the message storage module 84.

Alternately, when the synchronization-determination-overlay module 82 receives the message 150 from the message header generation module 80, the module 82 compares the buffer number (B1) to a second predetermined value corresponding to the a synchronization data buffer 34 of the computer 12 to determine whether the message 150 is a synchronization message to be transmitted from the computer 14. When the buffer number (B1) is equal to the second predetermined value, indicating that message 150 is a synchronization message, the module 82 obtains a time stamp value (TX_TIME2) generated by the network interface card clock 88. The time stamp value (TX_TIME2) corresponds to a time when the message 150 is transmitted from the computer 14. Thereafter, the module 82 overlays the time stamp value (TX_TIME2) in the message 150. Thereafter, the module 82 transfers the message 150 to the communication port 90 that transmits the message 150 through the communication network 16 to the communication port 50 of computer 12.

The message storage module 84 is provided to direct synchronization messages received by the computer 14 to the synchronization data buffer 74. For example, when the computer 14 receives the synchronization message 100, the synchronization-determination-overlay module 82 transfers the message 100 to the message storage module 84. Thereafter, the message storage module 84 transfers the message 100 to the synchronization data buffer 74.

Referring to FIGS. 8-11, a method for synchronizing time-of-day clocks in a networked system utilizing the network system 10 will be explained.

Figure 8:
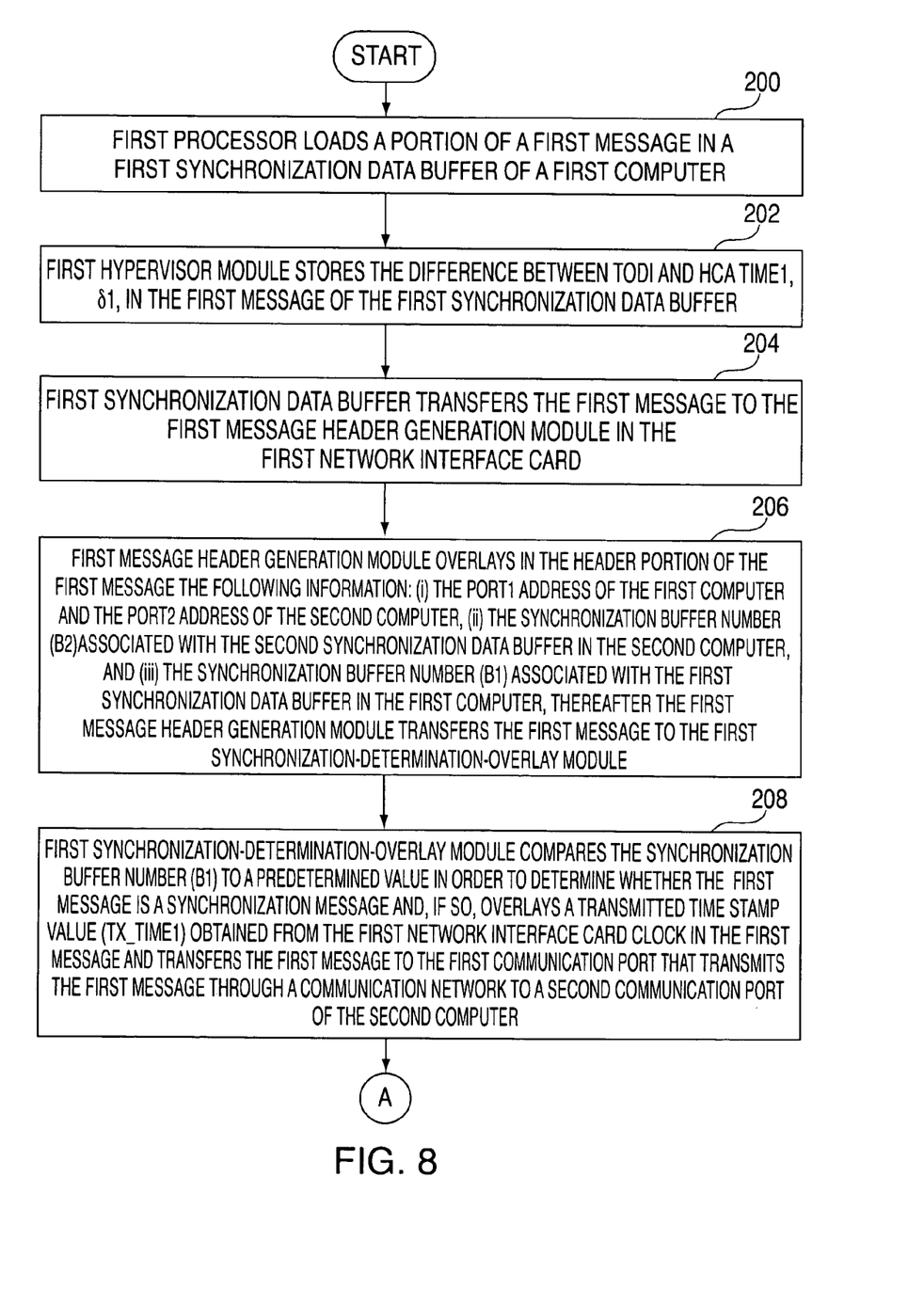
FIGS. 8-11 are flowcharts of a method for synchronizing first and second time-of-day clocks on first and second computers.

At step 200, the processor 80 loads a portion of the message 100 in the synchronization data buffer 34 of the computer 12.

At step 202, the hypervisor module 32 stores the difference value ($\delta 1$) between the time of day value (TOD1) generated by the time-of-day clock 30 and the time value (HCATime1) generated by the network interface card clock 48, in the message 100 of the synchronization data buffer 34.

At step 204, the synchronization data buffer 34 transfers the message 100 to the message header generation module 40 in the network interface card 20.

At step 206, the message header generation module 40 overlays in the header portion of the message 100 the following information: (i) the port1 address of the computer 12 and the port2 address of the computer 14, (ii) the synchronization buffer number (B2) associated with the synchronization data buffer 74 in the computer 14, and (iii) the synchronization buffer number (B1) associated with the synchronization data buffer 34 in the computer 12. Thereafter, the message header generation module 40 transfers the message 100 to the synchronization-determination-overlay module 42.

At step 208, the synchronization-determination-overlay module 42 compares the synchronization buffer number (B1) to a predetermined value in order to determine whether the message 100 is a synchronization message. When the message 100 is a synchronization message, the module 42 overlays a transmitted time stamp (TX_TIME1) obtained from the network interface card clock 48 in the message 100 and transfers the message 100 to the communication port 50. The communication port 50 transmits the message 100 through the communication network 16 to the communication port 90 of the computer 14.

Figure 9:
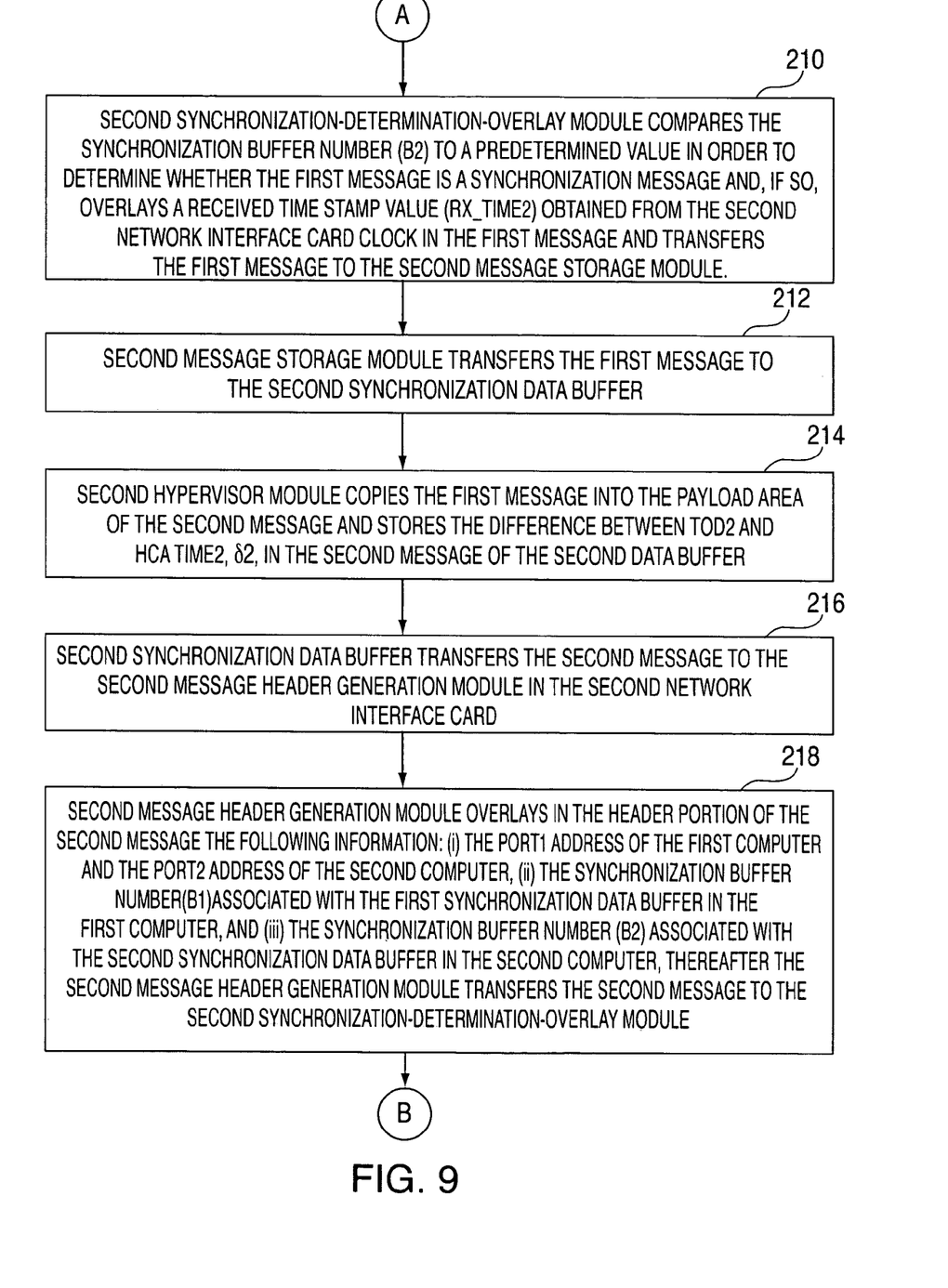

At step 210, the synchronization-determination-overlay module 82 compares the synchronization buffer number (B2) to a predetermined value in order to determine whether the message 100 is a synchronization message. When the message 100 is a synchronization message, the module 82 overlays a received time stamp value (RX_TIME2) obtained from the network interface card clock 88 in the message 100 and transfers the message 100 to the message storage module 84.

At step 212, the message storage module 84 transfers the message 100 to the synchronization data buffer 74.

At step 214, the hypervisor module 72 copies the message 100 into a payload area of a message 150 in the buffer 74. The hypervisor module 72 further stores the difference value ($\delta 2$) between the (TOD2) time value from the clock 70 and the (HCATIME2) value from the clock 88 in the message 150.

At step 216, the synchronization data buffer 74 transfers the message 150 to the message header generation module 80 in the network interface card 62.

At step 218, the message header generation module 80 overlays in the header portion of the message 100 the following information: (i) the port1 address of the computer 12 and the port2 address of the computer 14, (ii) the synchronization buffer number (B1) associated with the synchronization data buffer 34 in the computer 12, and (iii) the synchronization buffer number (B2) associated with the synchronization data buffer 74 in the computer 14. Thereafter, the message header generation module 80 transfers the message 150 to the synchronization-determination-overlay module 82.

Figure 10:
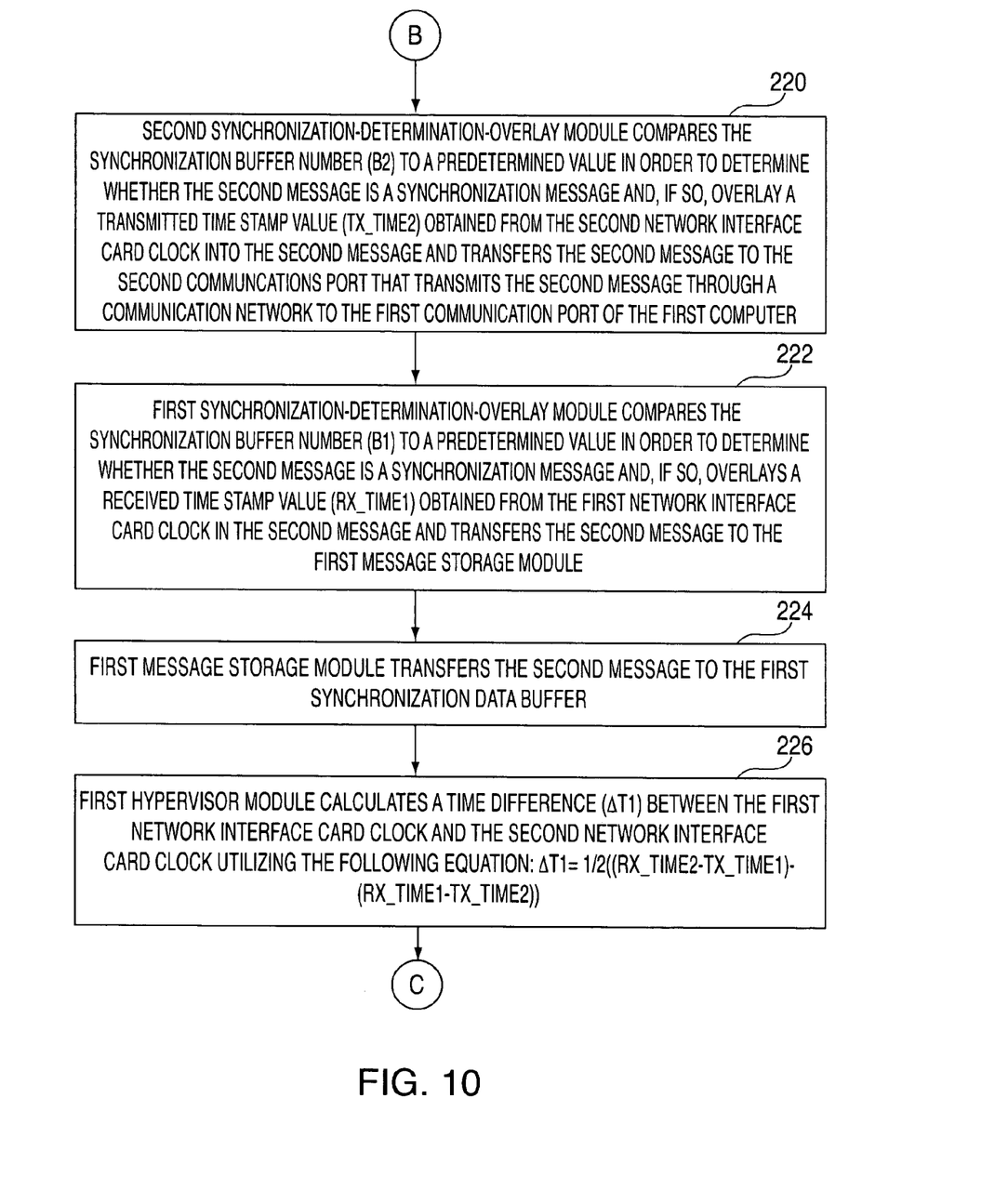

At step 220, the synchronization-determination-overlay module 82 compares the synchronization buffer number (B2) to a predetermined value in order to determine whether the message 150 is a synchronization message. When the message 150 is a synchronization message, the module 82 overlays a transmitted time stamp (TX_TIME2) obtained from the network interface card clock 88 in the message 150 and transfers the message 150 to the communication port 90. The communication port 90 transmits the message 150 through the communication network 16 to the communication port 50 of the computer 12.

At step 222, the synchronization-determination-overlay module 42 compares the synchronization buffer number (B1) IN THE MESSAGE 150 to a predetermined value in order to determine whether the message 150 is a synchronization message. When the message 150 is a synchronization message the module 42 overlays a received time stamp value (RX_TIME1) obtained from the network interface card clock 48 in the message 150 and transfers the message 150 to the message storage module 44.

At step 224, the message storage module 44 transfers the message 150 to the synchronization data buffer 34.

Figure 11:
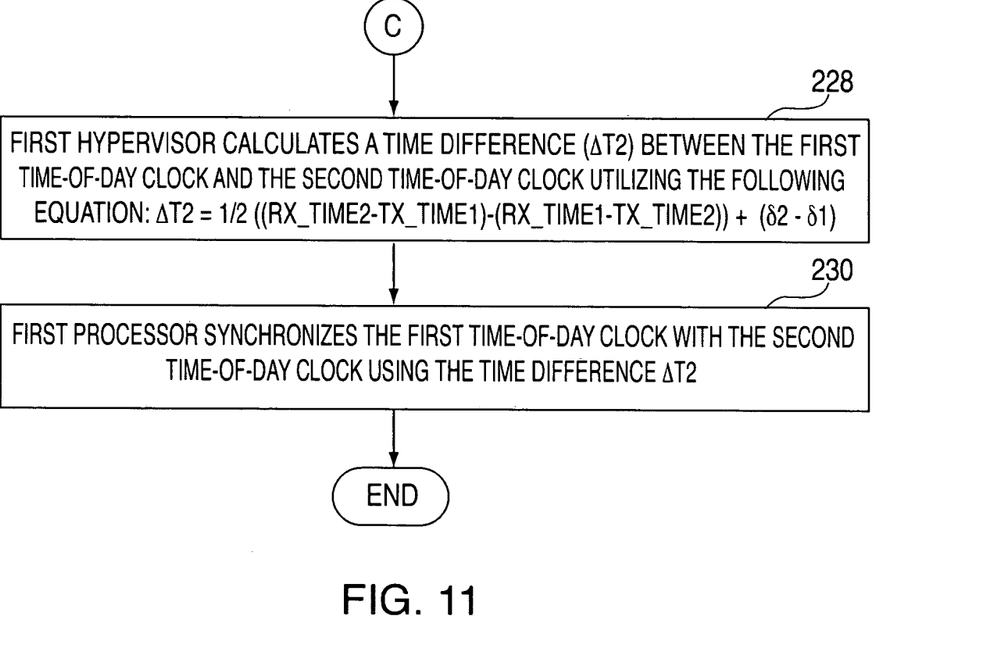

At step 226, the hypervisor module 32 calculates a time difference ($\Delta T1$) between the network interface card clock 48 and the network interface card clock 88 utilizing the following equation:

$$\Delta T1 = \tfrac{1}{2}((RX\_TIME2 - TX\_TIME1) - (RX\_TIME1 - TX\_TIME2))$$

At step 228, the hypervisor module 32 calculates a time difference ($\Delta T2$) between the time-of-day clock 30 and the time-of-day clock 70 utilizing the following equation:

$$\Delta T2 = \tfrac{1}{2}((RX\_TIME2 - TX\_TIME1) - (RX\_TIME1 - TX\_TIME2)) + (\delta 2 - \delta 1).$$

At step 230, the processor 18 synchronizes the time-of-day clock 30 with the time-of-day clock 70 using the time difference ($\Delta T2$).

The system and the method for synchronizing first and second time-of-day clocks in first and second computers, respectively, represents a substantial advantage over known systems and methods. The system and method provide a technical effect of utilizing time stamp values generated by first and second network interface cards clocks on the first and second computers, respectively, to more accurately synchronize the first and second time-of-day clocks. In particular, because the clocks on the network interface cards can generate extremely accurate time stamp values associated with receiving and transmitting messages, a more accurate synchronization of the time-of-day clocks can be obtained utilizing these time stamp values. In particular, the method and the system can achieve a sub-microsecond synchronization between the first and second time-of-day clocks.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, is intended that the invention not be limited the embodiment disclosed for carrying out this invention, but that the invention includes all embodiments falling with the scope of the intended claims. Moreover, the use of the term's first, second, etc. does not denote any order of importance, but rather the term's first, second, etc. are us are used to distinguish one element from another.

What is claimed is:

1. A method for synchronizing first and second time-of-day clocks on first and second computers, respectively, the first computer having a third clock on a first network interface card, the second computer having a fourth clock on a second network interface card, the first and second network interface cards communicating with one another via a communication network, the method comprising:

generating a first message having a first time difference value and a second time stamp value and transmitting the first message from the first network interface card, the first time difference value corresponding to a time difference between the first time-of-day clock and the third clock, the second time stamp value corresponding a time determined by the third clock on the first network interface card when the first message is transmitted from the first network interface card;

receiving the first message at the second interface card of the second computer;

generating a second message having the first time difference value, the second time stamp value, a third time stamp value, a fourth time difference value, and a fifth time stamp value and transmitting the second message from the second network interface card, the third time stamp value corresponding to a time determined by the fourth clock on the second network interface card when the first message is received by the second network interface card, the fourth time difference value corresponding to a time difference between the second time-of day clock and the fourth clock, the fifth time stamp value corresponding to a time determined by the fourth clock when the second message is transmitted from the second network interface card;

receiving the second message at the first network interface card and determining a sixth time stamp value associated with the second message, the sixth time stamp value corresponding to a time determined by the third clock when the second message is received by the first network interface card; and determining a seventh time difference value corresponding to a time difference between the first and second time-of-day clocks based on the first time difference value, the second time stamp value, the third time stamp value, the fourth time difference value, the fifth time stamp value, and the sixth time stamp value.

2. The method of claim 1, wherein the first message further comprises first and second port addresses, the first port address being associated with a first communication port of the first computer, the second port address being associated with a second communication port of the second computer.

3. The method of claim 2, wherein the first message further includes first and second buffer addresses, the first buffer address being associated with a first buffer in the first computer for receiving messages containing time stamp values, the second buffer address being associated with a second buffer in the second computer for receiving messages containing time stamp values.

4. The method of claim 1, further comprising:
modifying the first time-of-day clock based on the seventh time difference value to synchronize the first time-of-day clock with the second time-of-day clock.

5. A networked system, comprising:

a first computer having a first network interface card and a first time-of-day clock and a second computer having a second network interface card and a second time-of-day clock, the first network interface card having a third clock, the second network interface card having a fourth clock;

the first computer configured to generate a first message having a first time difference value and a second time stamp value and to transmit the first message from the first network interface card, the first time difference value corresponding to a time difference between the first time-of-day clock and the third clock, the second time stamp value corresponding a time determined by the third clock on the first network interface card when the first message is transmitted from the first network interface card;

the second computer configured to receive the first message at the second interface card, the second computer further configured to generate a second message having the first time difference value, the second time stamp value, a third time stamp value, a fourth time difference value, and a fifth time stamp value and to transmit the second message from the second network interface card, the third time stamp value corresponding to a time determined by the fourth clock on the second network interface card when the first message is received by the second network interface card, the fourth time difference value corresponding to a time difference between the second time-of day clock and the fourth clock, the fifth time stamp value corresponding to a time determined by the fourth clock when the second message is transmitted from the second network interface card; and the first computer further configured to receive the second message at the first network interface card and to determine a sixth time stamp value associated with the second message, the sixth time stamp value corresponding to a time determined by the third clock when the second message is received by the first network interface card, the first computer further configured to determine a seventh time difference value corresponding to a time difference between the first and second time-of-day clocks based on the first time difference value, the second time stamp value, the third time stamp value, the fourth time difference value, the fifth time stamp value, and the sixth time stamp value.

6. The system of claim 5, wherein the first message further includes first and second port addresses, the first port address being associated with a first communication port of the first computer, the second port address being associated with a second communication port of the second computer.

7. The system of claim 6, wherein the first message further includes first and second buffer addresses, the first buffer address being associated with a first buffer in the first computer for receiving messages containing time stamp values, the second buffer address being associated with a second buffer in the second computer for receiving message containing time stamp values.

8. The system of claim 5, wherein the first computer is further configured to modify the first time-of-day clock based on the seventh time difference value to synchronize the first time-of-day clock with the second time-of-day clock.

9. An article of manufacture, comprising:
a computer storage medium having a computer program encoded therein for synchronizing first and second time-of-day clocks on first and second computers, respectively, the first computer having a third clock on a first network interface card, the second computer having a fourth clock on a second network interface card, the first and second network interface cards communicating with one another via a communication network, the computer storage medium comprising:
code for generating a first message having a first time difference value and a second time stamp value and transmitting the first message from the first network interface card, the first time difference value corresponding to a time difference between the first time-of-day clock and the third clock, the second time stamp value corresponding a time determined by the third clock on the first network interface card when the first message is transmitted from the first network interface card;
code for receiving the first message at the second interface card of the second computer;
code for generating a second message having the first time difference value, the second time stamp value, a third time stamp value, a fourth time difference value, and a fifth time stamp value and transmitting the second message from the second network interface card, the third time stamp value corresponding to a time determined by the fourth clock on the second network interface card when the first message is received by the second network interface card, the fourth time difference value corresponding to a time difference between the second time-of day clock and the fourth clock, the fifth time stamp value corresponding to a time determined by the fourth clock when the second message is transmitted from the second network interface card;
code for receiving the second message at the first network interface card and determining a sixth time stamp value associated with the second message, the sixth time stamp value corresponding to a time determined by the third clock when the second message is received by the first network interface card; and
code for determining a seventh time difference value corresponding to a time difference between the first and second time-of-day clocks based on the first time difference value, the second time stamp value, the third time stamp value, the fourth time difference value, the fifth time stamp value, and the sixth time stamp value.

10. The article of manufacture of claim 9, wherein the first message further includes first and second port addresses, the first port address being associated with a first communication port of the first computer, the second port address being associated with a second communication port of the second computer.

11. The article of manufacture of claim 9, wherein the first message further includes first and second buffer addresses, the first buffer address being associated with a first buffer in the first computer for receiving messages containing time stamp values, the second buffer address being associated with a second buffer in the second computer for receiving messages containing time stamp values.

12. The article of manufacture of claim 9, further comprising code for modifying the first time-of-day clock based on the seventh time difference value to synchronize the first time-of-day clock with the second time-of-day clock.

* * * * *